Oct. 14, 1924.

K. SCHNETZER 1,511,302

SHUT-OFF VALVE FOR STEAM, GAS, OR FLUID

Filed March 14, 1921

INVENTOR
Karl Schnetzer
BY ATTORNEYS

Patented Oct. 14, 1924.

1,511,302

UNITED STATES PATENT OFFICE.

KARL SCHNETZER, OF OBERSEDLITZ, CZECHOSLOVAKIA.

SHUT-OFF VALVE FOR STEAM, GAS, OR FLUID.

Application filed March 14, 1921. Serial No. 452,171.

*To all whom it may concern:*

Be it known that I, KARL SCHNETZER, a citizen of Czechoslovakia Republic, residing at Obersedlitz, near Aussig, Czechoslovakia Republic, have invented certain new and useful Improvements in Shut-Off Valves for Steam, Gas, or Fluid, of which the following is a specification.

It is commonly known that steam valves as sold with joining faces of either mushroom, conical or plate-like shape, as they are especially used to a large extent in chemical plants, do not close tightly from the outset or will become leaky after a brief use.

The present invention relates to a straight line shut-off valve for steam, gas and also for fluid, which reliably keeps tight and will continue to keep tight even after a continuous and strained use.

The leakage of steam valves, as is well known, is a particular source of disturbance, in those cases where, after the action of the steam in chemical processes is ended, any further admission of steam or of condensation water must absolutely be prevented in order not to interfere with the carrying out of the process.

It has been proved that stop valves of the simple construction according to the present invention will reliably keep tight, even after long use, as soon as a suitable elastic packing material is selected.

A further advantage of this valve is that it does not jam in its closed or open position, but that moreover the piston might be moved easily into each desired position, while valves of the customary construction will mostly require a great deal of power in being closed, in order to effect a tight closure. But after cooling it will be possible to reopen them only by a good deal of rough handling, by which naturally the seats of the valves are subjected to injurious straining and in consequence will rapidly become useless.

The new valve also avoids a sudden too rapid opening, since it allows of a compulsory smooth opening.

If after a long use the elastic joint rings have worn out or become hard, the valve can be easily fitted up again even by an untrained hand by introducing fresh rings, without its being necessary to be taken out of the piping. A further advantage consists in a special stuffing-box for the spindle of the valve being dispensed with.

The present invention will be suitable for large chemical plants and anywhere else where similar conditions prevail, that is to say especially for open and closed heating steam.

In the accompanying drawing one mode of construction of the valve is shown.

Figure 1:
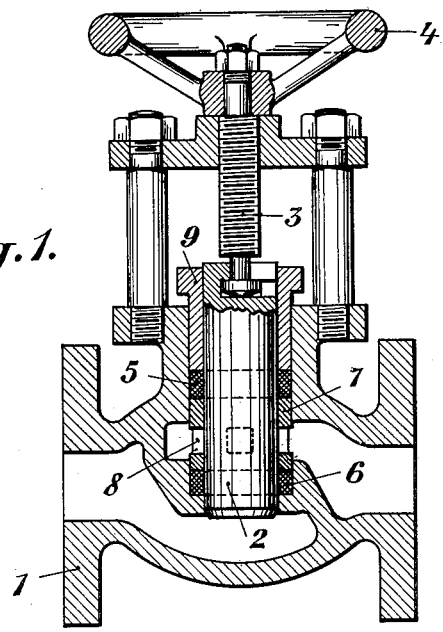
Fig. 1 is a longitudinal section.
Figure 2:
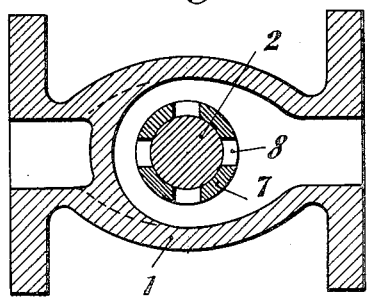
Fig. 2 is a horizontal section through an embodiment of the invention.

The valve according to the present invention consists of the valve chamber 1, in the cylindrical bore of which the solid walled piston 2, which, however, may be hollow, may be lifted and lowered by means of the screw spindle 3 and hand wheel 4.

The packing of the piston 2 is effected by means of two joint or packing rings 5 and 6 of elastic material, between which the distance piece or sleeve 7 is introduced, the latter effecting through its lateral borings or apertures 8 the passage of the steam.

The apertures 8 are preferably spaced around the circumference of the distance piece or sleeve 7, and an annular passage is cored in the valve casting in communication with these apertures in the sleeve. The packing rings 5 and 6 are also preferably of uniform thickness approximately equal to the thickness of the sleeve 7. A readjusting of the joint or packing rings 5 and 6 is accomplished by means of the gland 9 of the stuffing box, which in small-sized valves may be suitably constructed in the form of a screw-nut.

I claim:

1. In a valve of the type described, a solid walled piston, means for moving said piston axially, a sleeve enclosing said piston and having a plurality of apertures spaced around the circumference thereof, a valve chamber supporting said sleeve and having an annular passage communicating with the apertures in said sleeve, and a packing ring at each end of said sleeve, said rings being of uniform thickness approximately equal to the thickness of the sleeve, said piston and sleeve being arranged so that the passage of fluid through the apertures may be controlled by the axial movement of said piston.

2. In a valve of the type described, a solid walled piston, means for moving said piston axially, a sleeve enclosing said piston and having a plurality of apertures spaced around the circumference thereof, a valve chamber supporting said sleeve and having an annular passage communicating with the apertures therein, a packing ring at each end of said sleeve, said rings being of uniform thickness approximately equal to the thickness of the sleeve and a packing gland arranged so that one of said rings is accessible at all times.

3. In a valve of the type described, a solid walled piston, a sleeve enclosing said piston, said sleeve having a plurality of apertures spaced around the circumference thereof and arranged so that the passage of fluid may be regulated by moving said piston axially, and a packing ring on each end of said sleeve, the rings being of uniform thickness approximately equal to the thickness of the sleeve.

4. A straight line shut-off valve comprising a solid walled piston, means for moving said piston axially, a sleeve enclosing said piston and having a plurality of apertures spaced around the circumference thereof, a valve chamber supporting said sleeve and having an annular passage communicating with the apertures in said sleeve, and a packing ring at each end of said sleeve, said piston and sleeve being arranged so that the passage of fluid through the apertures may be controlled by the axial movement of said piston.

5. A straight line shut off valve comprising a solid walled piston, means for moving said piston axially, a sleeve enclosing said piston and having a plurality of apertures spaced around the circumference thereof, a valve chamber supporting said sleeve and having an annular passage communicating with the apertures therein, a packing ring at each end of said sleeve and a packing gland arranged so that one of said rings is accessible when said gland is removed.

6. A straight line shut-off valve, comprising a solid walled piston, a sleeve enclosing said piston, said sleeve having a plurality of apertures spaced around the circumference thereof, and arranged so that the passage of fluid may be regulated by moving said piston axially, and a packing ring on each end of said sleeve.

In testimony whereof I have affixed my signature in presence of two witnesses.

KARL SCHNETZER.

Witnesses:
D. HIETTNER,
J. E. CALLAHAN.